United States Patent [19]
Voelker

[11] 4,157,166
[45] Jun. 5, 1979

[54] EYEGLASSES HOLDER

[76] Inventor: Walter G. Voelker, 1524 N. Main St., Walnut Creek, Calif. 94596

[21] Appl. No.: 816,344

[22] Filed: Jul. 18, 1977

[51] Int. Cl.² ........................................... F16M 13/00
[52] U.S. Cl. .................................................... 248/317
[58] Field of Search ............... 248/102, 104, 110, 113, 248/317, 318, 511, DIG. 2, 201, 539; 211/66; 24/3 C, 10 R

[56] References Cited
U.S. PATENT DOCUMENTS

| | | | |
|---|---|---|---|
| 562,566 | 6/1896 | Baynes | 248/113 X |
| 1,329,394 | 2/1920 | Fry et al. | 248/539 X |
| 2,273,492 | 2/1942 | Malmer | 248/539 |
| 3,494,583 | 2/1970 | Parr | 24/257 R X |
| 3,552,701 | 1/1971 | Montagano | 248/DIG. 2 |
| 3,895,718 | 7/1975 | Seiller | 248/DIG. 2 |

FOREIGN PATENT DOCUMENTS

| | | | |
|---|---|---|---|
| 253160 | 7/1964 | Australia | 248/318 |
| 1076631 | 7/1967 | United Kingdom | 248/317 |

*Primary Examiner*—William H. Schultz
*Attorney, Agent, or Firm*—Bruce & McCoy

[57] ABSTRACT

A leather holder for eyeglasses having a hole for encircling a rearview mirror post on an automobile and a pair of lower holes which permit the insertion of the temple piece of an eyeglasses frame therethrough to support the eyeglasses frame in a captured vertical orientation.

1 Claim, 16 Drawing Figures

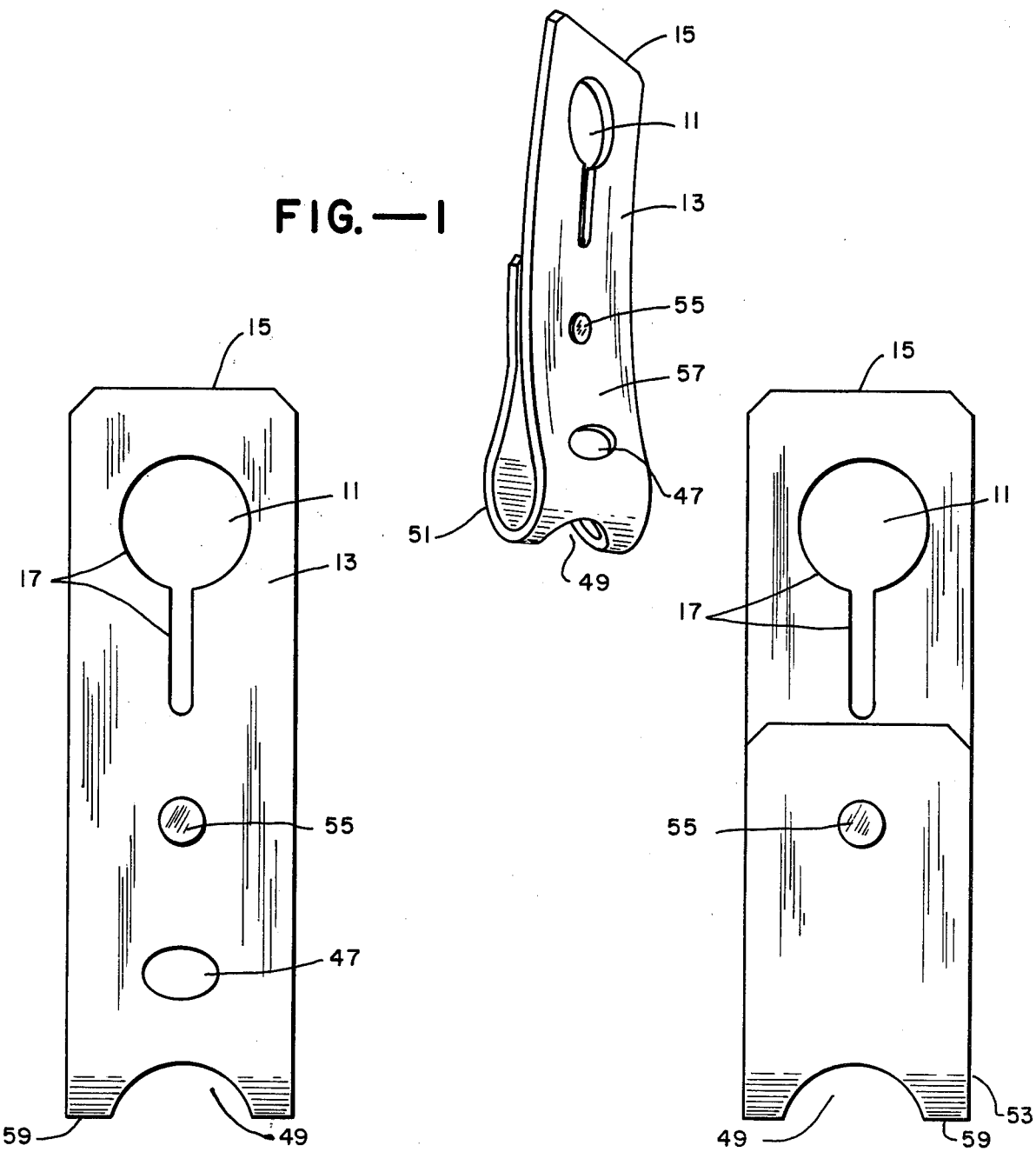

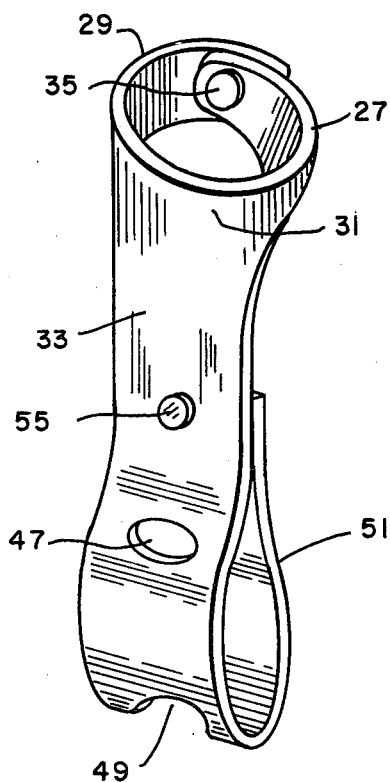
FIG.—5
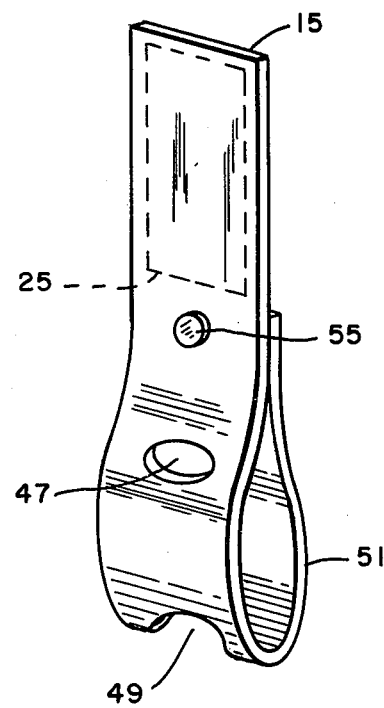
FIG.—6
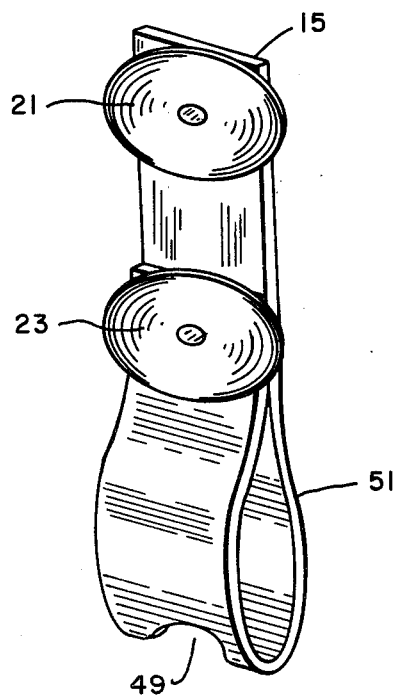
FIG.—7
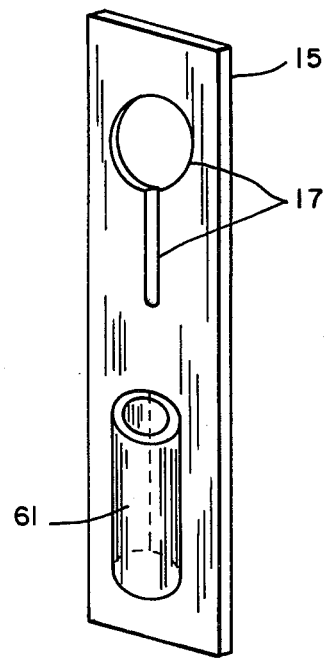
FIG.—8

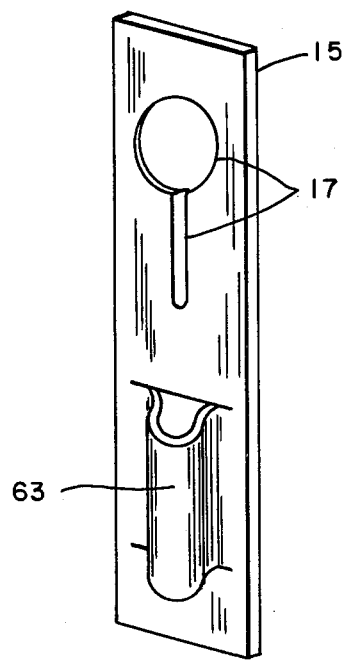
FIG.—9
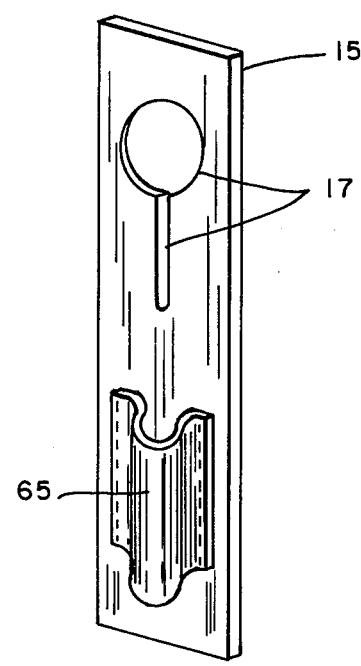
FIG.—10
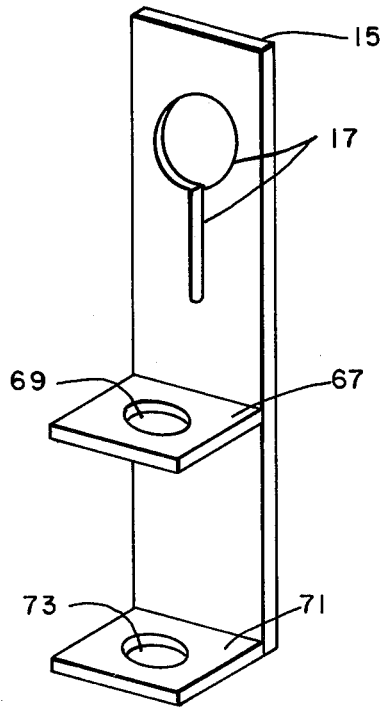
FIG.—11
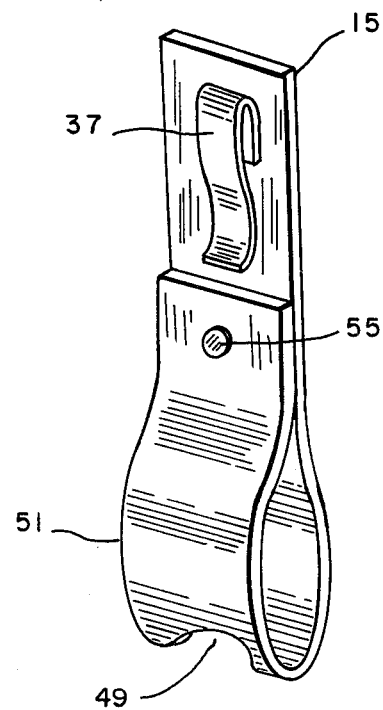
FIG.—12

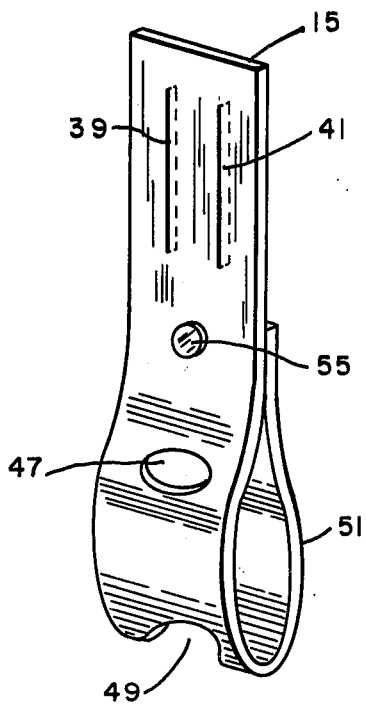
FIG.—13
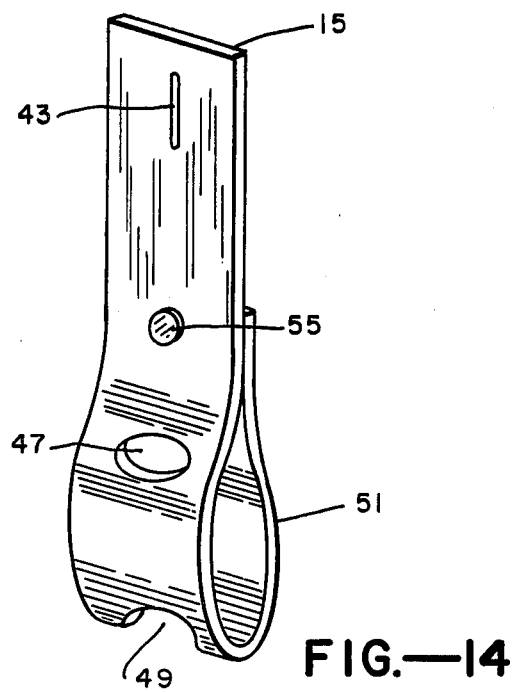
FIG.—14
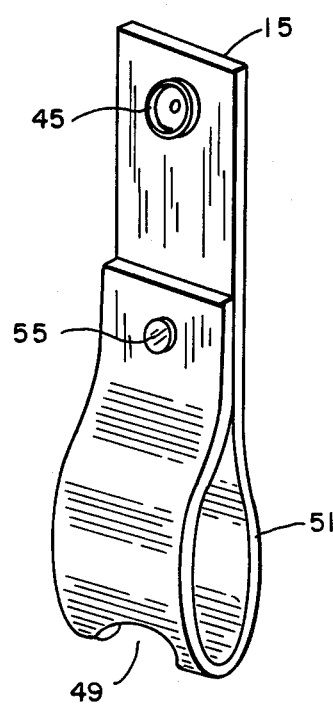
FIG.—15
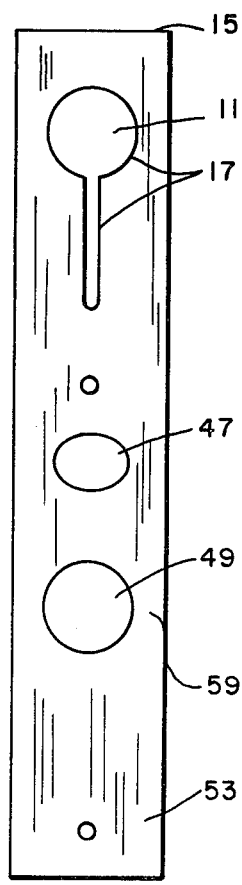
FIG.—16

EYEGLASSES HOLDER

BACKGROUND OF THE INVENTION

1. Field of the Invention

The present invention relates to eyeglasses holders and more particularly to an eyeglass holder which can be secured to a relatively permanent fixture and permitted to depend therefrom whereby the eyeglasses may be inserted therein and supported therein in a vertical depending orientation.

2. Description of the Prior Art

Devices for holding and storing eyeglasses are well known. Examples of glasses holding devices are shown in U.S. Pat. No. 2,102,218 to Rakaushas, U.S. Pat. No. 2,903,125 to Levoy, U.S. Pat. No. 2,918,959 to Block and U.S. Pat. No. 3,276,572 to Everburg. Such devices encase or surround most of the glasses frame and serve the primary function of protecting the lenses of the eyeglasses when the glasses are stored such as in a pocket.

The present invention provides an eyeglasses holder which, unlike conventional holders, is adapted for suspending glasses from a relatively fixed and conveniently located object, and which effects such suspension by securement of a single temple piece of glasses. The glasses holder of the present invention in its various embodiments can be secured from most any object (including even a flat wall) and has the unique advantage of permitting glasses to be placed in the holder with one hand and with minimal effort, minimum distraction (such as would be important when driving a car) and minimum manipulation. In the present invention the eyeglasses are supported in a folded condition and in a depending vertical orientation.

SUMMARY OF THE INVENTION

The present invention is an improved holder for eyeglasses which comprises an elongated band having an attachment means disposed at the upper end of the band for permitting the band to be attached to a fixed object to vertically depend therefrom. A pair of supporting means are disposed at the lower end of the band with the first of the supporting means being formed to encircle one of the temple pieces of a pair of eyeglasses at the hinged end thereof. The second of the supporting means is disposed to encircle the temple piece at a position between the free end and the hinged end thereof with the second supporting means being disposed below the first supporting means. As a result of this construction the temple piece is forced to depend vertically from the elongated band and said eyeglasses when folded will be securly suspended from said band.

OBJECTS OF THE INVENTION

It is therefore an important object of the present invention to provide an improved eyeglass holder which can be secured to a readily accessible object.

It is another object of the present invention to provide an improved eyeglass holder which will securely capture the eyeglasses therein and support them in a depending vertical orientation and in a folded condition.

It is a further object of the present invention to provide an eyeglass holder which is adapted to a multiple of different securement means disposed at the upper end thereof for engaging different types of objects.

It is still another object of the present invention to provide an improved eyeglass holder wherein insertion of eyeglasses into the holder can be done easily with minimum hand minipulation.

It is still a further object of the present invention to provide an improved holder for eyeglasses which can be mounted on the rearview mirror post of an automobile to support eyeglasses in a convenient position proximate the driver of the automobile wherein when needed the driver can easily and quickly retrieve the glasses and wherein when not needed the glasses can be easily replaced.

Yet other objects of the present invention will become apparent from the following specification and claims.

DESCRIPTION OF THE DRAWINGS

FIG. 1 is a perspective view of a preferred embodiment of the Eyeglasses Holder of the present invention.

FIG. 2 is a front elevational view thereof.

FIG. 3 is a rear elevational view thereof.

FIG. 4 is a side elevational view thereof.

FIG. 5 is a perspective view of an alternative embodiment of the present invention.

FIG. 6 is a perspective view of another alternative embodiment of the present invention.

FIG. 7 is a perspective view of still another alternative embodiment of the present invention.

FIG. 8 is a perspective view of a further alternative embodiment of the present invention.

FIG. 9 is a perspective view of still a further alternative embodiment of the present invention.

FIG. 10 is a perspective view of another alternative embodiment of the present invention.

FIG. 11 is a perspective view of still another alternative embodiment of the present invention.

FIG. 12 is a perspective view of a further alternative embodiment of the present invention.

FIG. 13 is a perspective view of still a further alternative embodiment of the present invention.

FIG. 14 is a perspective view of another alternative embodiment of the present invention.

FIG. 15 is a perspective view of still another alternative embodiment of the present invention.

FIG. 16 is a top plan view of a pre-punched piece of material from which the holder of FIGS. 1-4 is made.

DESCRIPTION OF THE PREFERRED EMBODIMENT

The present invention is an improved holder which is principally adapted for holding eyeglasses, but which can also be used to hold any other item, such as a pipe, having a thin stem with an enlarged upper end to prevent the held item from slipping through the securement means at the lower end of the holder.

In its preferred embodiment, the holder is made of fine grain leather and is cut from an elongated band of uniform width and thickness; however, it is understood that different suitable materials might be used and that uniform width and thickness of the band is not essential. In fact variations in width and thickness may be necessary to provide variant functional designs within the scope of the invention and might additionally be employed for aesthetic enhancement.

Referring now to the drawings, with specific attention to FIGS. 1-4, an attachment means 11 is disposed at or near the upper end 12 of the band 15 for permitting the band to be attached to a fixed object (not shown)

and to vertically depend therefrom. In the embodiment shown in FIGS. 1-4 this attachment means is a key hole shaped slot 17 which would permit the holder to be slipped over a rearview mirror or other projecting object in an automobile such as the sun shade support rod. In this embodiment it is necessary to unscrew the automobile mirror to place the holder on the post.

FIGS. 5-7 and 12-15 of the drawings show alternative embodiments of the attachment means, each of which is adapted for convenient securement of the holder to different types of objects. In FIG. 7 the attachment means include suction cups 21, 23 which permit the holder to be secured to a flat vertical surface; another alternative attachment means is a magnet 25 sewn into or secured to the upper end of the holder as seen in FIG. 6; and still another alternative is a pair of encircling straps 27, 29 shown in FIG. 5 as being formed at the top end 31 of the band 33 and being joinable at their free ends by a snap 35. Other upper end attachment means, as shown in FIGS. 12 and 13, could include a clip 37 (FIG. 12) for securing the holder to a relatively thin, planar structure such as a belt or visor, or in FIG. 13 a pair of slits 39, 41 cut in the band itself for directly mounting the holder on a belt. FIGS. 14 and 15 show still further possible embodiments of the attachment means in the form of a button hole 43 (FIG. 14) and a snap 45 (FIG. 15) for mounting with a mating button or snap secured to some other object.

An important feature of the invention is the ability to support the eyeglasses in a folded vertical captured orientation. This is achieved by providing a pair of supporting means disposed at the lower end of the band. The first of the supporting means is formed to encircle one of the temple pieces of the pair of eyeglasses at its hinged end, that is, at the end proximate the front frame portion of the eyeglasses which holds the lenses. The second of the supporting means is disposed below the first supporting means at a position whereby it will encircle the temple piece roughly midway between its free end and hinged end. The cooperation of the two supporting means act to hold the weight of the sunglasses while forcing the temple piece to depend vertically from the elongated band. The holder will tend to keep the eyeglasses once folded in a folded condition and will secure the glasses firmly without the possibility of accidental dislodgement.

In the embodiments shown in FIGS. 1-7 and 12-15, the eyeglasses supporting means is comprised of two openings 47, 49 formed in a loop 51 which itself is formed in the depending end 53 of the band 15 by folding this end of the band back on itself and securing the end in this position by an attachment means, such as rivet 55. Preferably the loop is flattened, by any suitable pressue applying means, as much as the material of the band will permit. The first of the supporting means is formed by disposing the first opening 47 of the two openings 47, 49 in the flat vertical side 51 of the loop 51, and the second supporting means by disposing the second opening 49 proximate the bottom fold line 59 of the loop. Both openings are generally circular in shape, and of a size to accept the temple piece of the glasses, but preferably not so large as to allow the temple piece too much play whereby rigid securement of the glasses might be jeopardized. A slight elipse can be given to the first supporting means opening 47 to facilitate insertion of the usually flat free end of the temple piece.

To insert a pair of eyeglasses in the holder of the present invention as shown in FIGS. 1-7 and 12-15, the free end of the temple piece is first inserted downwardly in the first opening 47 of the two openings 47, 49, and from there further downwardly and somewhat outwardly through the second opening 49 to the full extent permitted by the glasses frame. So inserted the temple piece will be securely captured in a vertical orientation and will extend below the depending end 53 of the band 15. With the same hand, the remaining unsecured temple piece of the glasses can now be tucked into a conventional folded position next to the temple piece secured by the holder.

FIGS. 8-11 show possible alternative embodiments of the supporting means at the bottom end of the band 15. In FIGS. 8-10 the supporting means 61, 63, 65 is integrated into a single structure, such as the tubing 61 of FIG. 8 or the elongated pockets 63, 65 of FIGS. 9 and 10. In each of these instances the first supporting means is formed by the top end of the tubing or the pocket as shown, and the second supporting means is formed by the lower end of the tubing or pocket.

Therefore, the present invention is a unique holder for eyeglasses or the like which is adapted to be attached to and suspended from a wide variety of relatively fixed objects, and in which a pair of eyeglasses can be easily, quickly and conveniently inserted.

While the invention has been described in considerable detail it is not to be limited to such details except as may be necessitated by the appended claims.

I claim:

1. An improved holder for eyeglasses or the like comprising
    an elongated band wherein the lower end of the elongated band is folded upwardly and secured to the center portion of said band forming a loop,
    attachment means disposed at the upper end of the band for permitting the band to be attached to a fixed object and to vertically depend therefrom,
    a pair of supporting means disposed proximate the looped end of the band, the first of said supporting means comprising a first opening disposed on a flat vertical side of the looped portion of said elongated band such that it can encircle one of the temple pieces of a pair of eyeglasses at the hinged end thereof proximate the frame containing the lenses of the eyeglasses, and the second of said supporting means comprising a generally circular second opening disposed on the elongated band proximate the fold line of said looped portion thereof such that it can encircle the temple piece of said eyeglasses at a position between the free end and the hinged end thereof,
    said first and second supporting means being permanently disposed in a straight alignment relative to each other, such that the free end of the temple piece of the eyeglasses may be downwardly inserted through the first and then second supporting means whereby said temple piece can in a single downward movement be forced to depend vertically from said elongated band and said eyeglasses when folded can be suspended securely from said band.

* * * * *